(12) United States Patent
Stelzl (10) Patent No.: US 10,449,892 B2
(45) Date of Patent: Oct. 22, 2019

(54) SIGNAL LIGHT (71) Applicant: Thomas Kurt Stelzl, Graz (AT)

(72) Inventor: Thomas Kurt Stelzl, Graz (AT)

( * ) Notice: Subject to any disclaimer, the term of this patent is extended or adjusted under 35 U.S.C. 154(b) by 0 days.

(21) Appl. No.: 15/767,452

(22) PCT Filed: Oct. 14, 2016

(86) PCT No.: PCT/AT2016/060076
§ 371 (c)(1),
(2) Date: Apr. 11, 2018

(87) PCT Pub. No.: WO2017/063013
PCT Pub. Date: Apr. 20, 2017

(65) Prior Publication Data
US 2018/0281665 A1    Oct. 4, 2018

(30) Foreign Application Priority Data

Oct. 14, 2015  (AT) ............... A 50875/2015

(51) Int. Cl.
| | |
|---|---|
| *B60Q 1/00* | (2006.01) |
| *B60Q 1/26* | (2006.01) |
| *B60Q 1/52* | (2006.01) |
| *B60Q 7/00* | (2006.01) |
| *G09F 21/04* | (2006.01) |
| *G09F 13/22* | (2006.01) |

(52) U.S. Cl.
CPC .......... *B60Q 1/2615* (2013.01); *B60Q 1/2611* (2013.01); *B60Q 1/2673* (2013.01); *B60Q 1/52* (2013.01); *B60Q 7/00* (2013.01); *G09F 13/22* (2013.01); *G09F 21/04* (2013.01); *B60Q 2900/30* (2013.01); *G09F 2013/222* (2013.01)

(58) Field of Classification Search
None
See application file for complete search history.

(56) References Cited

U.S. PATENT DOCUMENTS

| | | |
|---|---|---|
| 5,572,188 A | 11/1996 | Robert |
| 6,708,433 B1 | 3/2004 | Falkner et al. |
| 7,088,222 B1 | 8/2006 | Dueker et al. |
| 2004/0184276 A1 | 9/2004 | Moll |
| 2005/0135092 A1 | 6/2005 | Leslie et al. |
| 2008/0123359 A1 | 5/2008 | Larochelle |
| 2011/0249430 A1 | 10/2011 | Stamatatos et al. |
| 2014/0126187 A1 | 5/2014 | Bennett et al. |
| 2015/0266450 A1 | 9/2015 | Gilson |

FOREIGN PATENT DOCUMENTS

| | | |
|---|---|---|
| AT | 407977 B | 7/2001 |
| DE | 19522420 A1 | 10/1996 |
| DE | 202004013522 U1 | 12/2004 |
| DE | 102010025607 A1 | 1/2012 |
| DE | 102010053155 A1 | 6/2012 |
| DE | 202013103219 U1 | 9/2013 |
| FR | 2278536 A1 | 2/1976 |
| JP | 2007207623 A | 8/2007 |
| WO | 2007030852 A1 | 3/2007 |

*Primary Examiner* — Vip Patel
(74) *Attorney, Agent, or Firm* — Smartpat PLC (57) ABSTRACT

Signal light with several light sources, e.g. LEDs (1), in an X- or cross-shaped arrangement on an X- or cross-shaped support (2) with a transparent or translucent cover (3) on one side, the front side, whereby the support (2) including the cover (3) is arranged in a suitable x- or cross-shaped housing (4) which is open on one side, the front side, and consists of a soft-elastic natural or synthetic rubber material, e.g. a thermoplastic elastomer (TPE,TPV).

17 Claims, 8 Drawing Sheets

SIGNAL LIGHT

TECHNICAL FIELD

The invention concerns a signal light with several light sources, for example LEDs, in an X- or cross-shaped arrangement on a support with a transparent or translucent cover on one side, the front side.

BACKGROUND

For the securing of a site of accident or a wrecked vehicle, the use of a so-called "reflective breakdown triangle" is known in order to secure the site of the accident and/or the parked vehicle and to draw the attention of other traffic participants to the accident occurrence or the (wrecked) vehicle and to warn them in order to prevent a new accident occurrence caused by following traffic. Usually, such known breakdown triangles comprise three bars of equal length which are fitted with a reflective surface to reflect the light from vehicles to create a visual warning. However, practice has shown that these known breakdown triangles have disadvantages. So, the visibility of a breakdown triangle which is visually conspicuous only because of the reflection of the light beam of a vehicle may only be given for the vehicle approaching the breakdown triangle when the brake path available for a safe deceleration of the vehicle in hand off the site of the accident is no longer sufficient. If the light of a vehicle is too faint or is cast onto the breakdown triangle at an angle that is not right, the warning effect may be accordingly insufficient. A further considerable reduction of the visibility of the breakdown triangle is given under poor weather conditions, such as heavy precipitation with rain or snow, fog, smoke development in the vicinity of the site of the accident, as well as at dawn or dusk and in the dark.

Such a breakdown triangle is described in DE 20 2004 013 522 U1, for example.

In order to eliminate these known disadvantages of a breakdown triangle, it was already suggested to equip a breakdown triangle with different active lighting units, like for example with light-emitting diodes (LEDs) which, alone or in combination with optical fibers, emit visual signals, cf. for example DE 20 2013 103 219 U1, DE 10 2010 025 607 A1 and AT 407 977 B.

From U.S. Pat. No. 5,572,188 A, an x-shaped signal light is known, which is equipped with LEDs which are operated with batteries which are arranged inside the signal light. The signal light can be folded and is stored in an elongated covering when not used, whereby the covering can be used as a foot in the operating state of the signal light.

DE 10 2010 053 155 A1 discloses a breakdown triangle which is equipped with a transmitter which is designed to transmit a radio signal to a receiver. The receiver is arranged inside a vehicle and connected with a signal processing device which evaluates the signal transmitted by the breakdown triangle and reproduces it visually or acoustically.

From US 2005/0135092 A1, a breakdown triangle is known, which has flashing and non-flashing light sources, whereby the flashing light sources are arranged at the rear of the breakdown triangle and the non-flashing light sources at the front of the triangle.

FR 2 278 536 discloses a triangular safety cover for a breakdown triangle, which is fixed on the breakdown triangle with snap-fit connections.

Another known possibility for the warning of other traffic participants about an accident occurrence or a wrecked vehicle is the use of so-called "warning lights". Such warning lights mostly comprise a housing for the placement of a light source and/or an electronic system controlling the light source, a parabolic reflector and a transparent disk which may in turn contain refractive elements in addition. The light discharge surface faces the arriving traffic participants in order to warn them through the action of light. Such warning lights, which are also used to secure construction sites in particular, have been state of the art for a long time (cf. for example: DE 195 22 420 A1). Even though such warning lights have been further developed over the course of time, they still have different shortcomings. In particular under poor conditions of visibility in the event of precipitation, i.e. rain or snow, smoke development, sand storm, snow storm, etc., they can be mistaken for brake lights, rear lights or flashing lights. In addition to that, the light elements may get damaged when the outer covering is broken, in particular when you take into consideration that such a warning light is transported in the trunk of a vehicle without being attached in a fixed place so that it can easily slip out of place, aside from the fact that when pieces of baggage are transported, these pieces of baggage can damage the warning light.

For the securing of an accident site or a wrecked vehicle, breakdown triangles and warning lights are always set up at a certain distance to the site to be secured according to legal regulations. However, practice has shown that this can have considerable negative effects. When a car breaks down in the city center, a breakdown triangle or a warning light sitting on the ground is already hidden by the vehicle directly following it so that the vehicles behind it no longer notice the breakdown triangle or the warning light and so are no longer informed about the accident or breakdown occurrence. In the event of accidents or breakdowns on through roads or highways, approaching vehicles—in particular trucks because of the elevated viewing angle—notice breakdown lights or breakdown triangles only when it is already too late and repeatedly "run them over" so that no warning effect is achieved any longer because they are destroyed in the process, and the risk for all traffic participants increases as a result.

Even though motor vehicles themselves are constantly being further developed with a view to the improvement of their active and passive safety systems, it is not possible to prevent accidents completely. In order to mitigate the consequences of such accidents, it is crucial that rescue forces are directly informed about the occurrence as well as the precise site of the accident in order to ensure technical and medical assistance as quickly as possible. The use of an emergency call system, with devices installed in vehicles which have a device receiving locating signals from satellites for the determination of the position of the vehicle, and a transmitter device for the transmission of information comprising the vehicle position to receivers, is advantageous here. Such information systems have become known under the description "eCall". eCall (short form for "emergency call") is an automatic emergency call system the installation of which in all new car models and certain utility vehicles is obligatory from 31 Mar. 2018 onwards. When there is an accident, a crash sensor makes an automatic emergency call. It also comprises the exact GPS position data of the vehicle so that rescue forces can take action in an optimum way because they know precisely where the accident site is. A disadvantage of this technology is that it will only be available as standard from 2018 onwards for future new cars and consequently the large number of today's vehicle owners have no direct access to this rescue device which is very necessary indeed.

In the light of the disadvantages described of breakdown triangles, signal lights and automatic emergency call systems, a solution has been searched for after long investigations, after numerous tests and continuous improvements for that reason. For example, PCT/AT2006/000379 proposed the integration of a visual warning element into a fuel canister—hereinafter referred to as canister for short. There, it was proposed that the warning element forms a separate body which is fixed in a recess or beading in one of the walls of the canister. Thus, the canister body surrounding the recess assumes a protective function for the visual warning element. However, practice has shown that this arrangement of a wall element inside a canister cannot deliver a flawless result.

Now, it is the objective of the invention to create a mobile warning device in the form of a signal light which ideally combines the advantages of a breakdown triangle, a warning light and an emergency call system. Specifically, it is the objective of the invention to create a signal light which, because of its special shape, is already a warning symbol whose light fixture is particularly protected, which can be installed using an adapter system in different positions elevated with respect to traffic, which preferably can, e.g. by means of GPS, determine the respective own geographic position and transmit messages to recipients of information by means of GSM/GPRS/HSPA standard and receive messages from transmitters of information. In addition to that, the aim is that the signal light can be controlled based on the Bluetooth standard by means of a separate remote control or a so-called "app" via a mobile phone.

SUMMARY

To achieve the objective described above, the signal light according to the invention has the characteristics indicated in claim 1. Preferred embodiments are indicated in the dependent claims.

According to the invention, the support including cover is arranged in a suitable x- or cross-shaped housing which is open on one side, the front side, and is made of a soft-elastic natural or synthetic rubber material, e.g. a thermoplastic elastomer (TPE, TPV).

In a preferred embodiment of the invention, it is advantageous for easy assembly when the housing is connected with the support and/or the cover by means of a snap-fit connection.

It is advantageous when the housing has, at the front side, a beaded edge which overlaps the support and/or the cover at the edge. Preferably, the beaded edge is closed in itself here.

For the use of the signal light outdoors, it is advantageous when the outer housing has a Shore A hardness of 50-80.

In the signal light according to the invention, the transparent or translucent cover is preferably fixed to the support with a screwed connection, adhesive connection or ultrasound welding connection.

It is also advantageous when the housing and/or the support has/have a central receiving part for an electronic unit from which cross arms extend away. There, it is advantageous that the electronic unit preferably has one or several switching elements which is/are accessible from the rear of the support—for example in the form of membrane switches or key switches. In that connection, it is also preferred when the electronic unit contains a radio unit with at least one radio transmitter and/or one radio receiver which can send or transmit the signals preferably with the GSM/GPRS/HSPA standard. In that way, it is for example possible to transmit a data message as an emergency call to a central monitoring station and to receive a response as acknowledgment for the receipt of the emergency call from it.

Preferably, it is also provided that the electronic unit comprises a GNSS ("Global Navigation Satellite System") unit or the like which can determine the geographical position of the signal light and transmit this position to a central monitoring station, in particular in the scope of a GSM/GPRS/HSPA emergency call. It is particularly advantageous when the geographic position of the signal light is also transmitted to other traffic participants, whereby a mobile phone or a tablet receives the signal and evaluates it with an installed app here, for example. In that way, other traffic participants can be alerted to a dangerous situation as early as possible.

In a preferred embodiment, the electronic unit has switching elements which are preferably arranged at the rear of the support and are, for example, provided to switch the signal light on or off, to toggle between different light modes and, for example, to activate a radio signal, GNSS signal or Bluetooth signal. Preferably, the different light modes are marked in such a way that certain LEDS are switched on and others switched off in a certain light mode. In that way, different light patterns such as arrows can be visualized. In an advantageous manner, all LEDs or only certain LEDs can preferably be used in a flashing mode as well, whereby there will be an automatic and cyclical switching on and off of the LEDs with a predetermined frequency here. Different frequencies can also be selected in particular in order to visualize different light or flashing patterns.

In a particularly preferred embodiment, the electronic unit has a booster switch and/or a dimmer switch which can preferably be switched using switching elements at the rear of the signal light. The booster switch increases the light intensity of the LEDs, whereby that is advantageous in fog or snow, for example. The dimmer switch reduces the light intensity of the LEDs, whereby that is advantageous in cities.

According to another preferred embodiment, it is provided that there is an adapter for the fixing of the signal lights on different receiving parts on the housing. Such a receiving part is a suction attachment device for the roof of a vehicle, for example, for positioning the signal light in such a manner that it is clearly visible for approaching vehicles in traffic and protected from damage caused by its being "run over". Another receiving part is, for example, a bolt attachment device to connect the signal light with a safety cone.

In a particularly preferred embodiment, the adapter on the housing of the signal light has the form of a ball-shaped adapter, whereby a disk-shaped receiving opening which receives the ball-shaped adapter is arranged on one receiving part in particular. In that way, a ball joint like connection can be established between the signal light and the receiving part, as a result of which a connection that can rotate completely around at least one axis and partially around two further axes is realized.

In a further embodiment, the attachment is preferably equipped with a clamped, snap-fit or screwed connection to enable the fixing of the signal light to a crash barrier or a concrete protective wall, for example.

In order to ensure the energy supply for the signal light, a recess for batteries or accumulators is provided in a preferred embodiment. Preferably, the recess is arranged at the rear of the signal light, whereby a cover fixes and protects the batteries arranged inside the recess. Battery compartments on electric appliances are described in the state of the art so that a more detailed description of the functional principle can be dispensed with.

In a particularly preferred embodiment, the signal light has an accumulator, for example a lithium-ion accumulator, which is arranged inside the support. A charging cable which is used to recharge the accumulator can be connected by means of a plug connection which is preferably arranged on the outside of the housing. For example, the charging cable can be connected to a 12V socket in order to ensure recharging of the signal light in a vehicle. In another embodiment, the signal light can be recharged via a USB plug connection. The cover of the plug connection is integrated in particular in the housing which is preferably made of a soft-elastic natural or synthetic rubber material. In that way, the plugged connection is protected from weather conditions such as rain or snow.

In order to check the state of charge of the accumulator or the batteries, a switching element is preferably provided, which indicates the state of charge at the touch of a button. Preferably, the state of charge is indicated by an LED, in particular by several LEDs, which is/are arranged in the support of the signal light, essentially on one of the cross side arms. For example, the state of charge is visualized based on the number of the illuminated LEDs, whereby preferably an illuminated LED indicates a low state of charge and several illuminated LEDs indicate a high state of charge.

In another preferred embodiment, the LEDs have different colors, whereby preferably the color of the LED arrangement can be changed. Advantageously, a blue LED light can be created for relief forces in that way, for example, or a yellow LED light for construction site vehicles. Preferably, the color is selected by means of a switching element which is arranged on the signal light, or in particular with a mobile phone, a tablet or a remote control.

In order to radiate the light emitted by the LEDs as evenly as possible and in an optimum manner, Fresnel lenses are arranged on the LEDs in another preferred embodiment.

In another embodiment, the signal light can be arranged by means of a belt or in a transparent carrier compartment or carrier mesh on a piece of clothing, for example. That improves the visibility and therefore also the safety of persons, for example at the site of an accident.

Below, the invention is further illustrated by way of exemplary embodiments based on the drawing, without being limited to these embodiments. This drawing shows preferred exemplary embodiments of the invention and is not intended to serve as a definition of the limits and the sphere of the invention. All equivalent changes and modifications are part of the scope of protection of this invention.

BRIEF DESCRIPTION OF THE DRAWINGS

In the drawing, the following show in detail:

FIG. 6 in FIGS. 6a and 6b, two further schematic illustrations of the signal light during use on warning signs.

DETAILED DESCRIPTION

Figure 1:
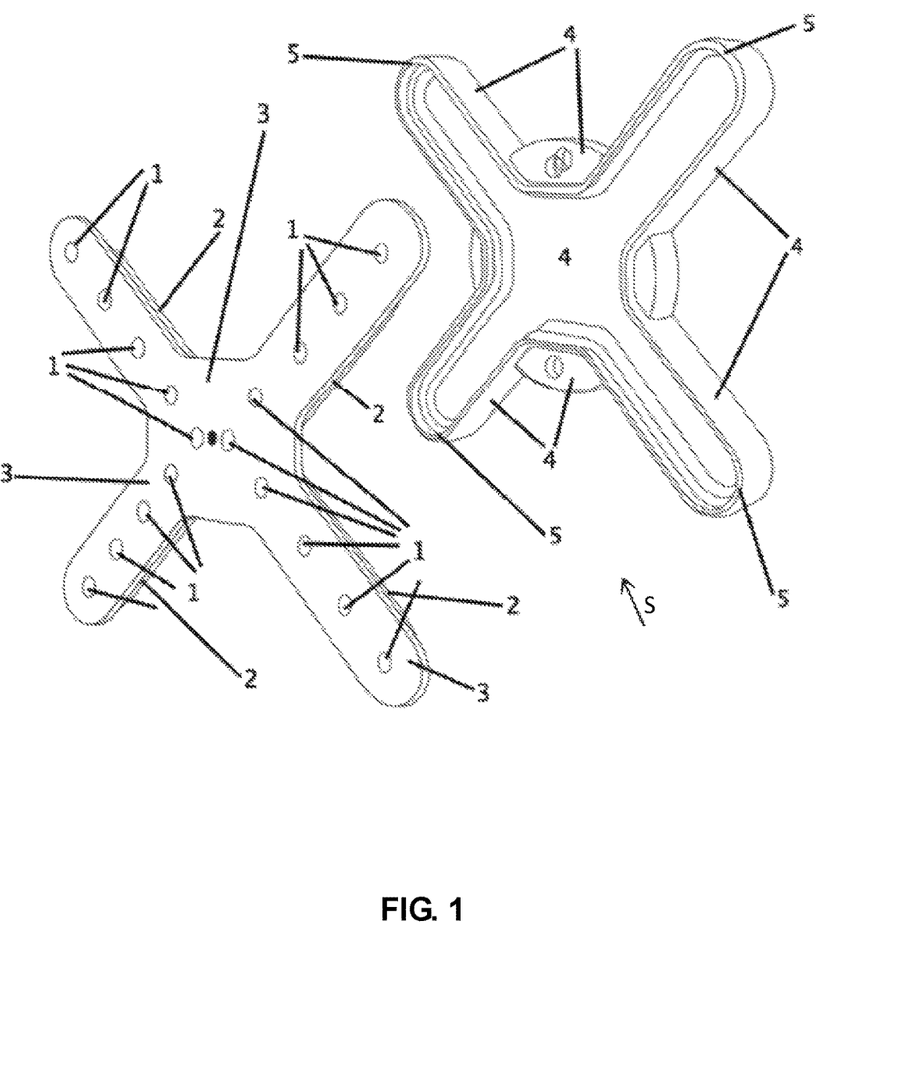
FIG. 1 a schematic illustration of the signal light in hand in the form of an exploded diagram.

FIG. 1 shows an exemplary signal light S which has a support 2, a cover 3 and a housing 4. On the support 2, numerous LEDs 1 are arranged, which are covered by the cover 3 in the installed state. The unit comprising the support 2 and the cover 3 is fixed in the housing 4. A beaded edge 5 overlaps the cover 3 at the edge. The cover 3 is transparent or translucent to pass on the light signal of the LEDs 1 into the surroundings. The complete unit comprising the housing 4, the support 2 and the cover 3 is designed in an X- or cross shape.

Figure 2:
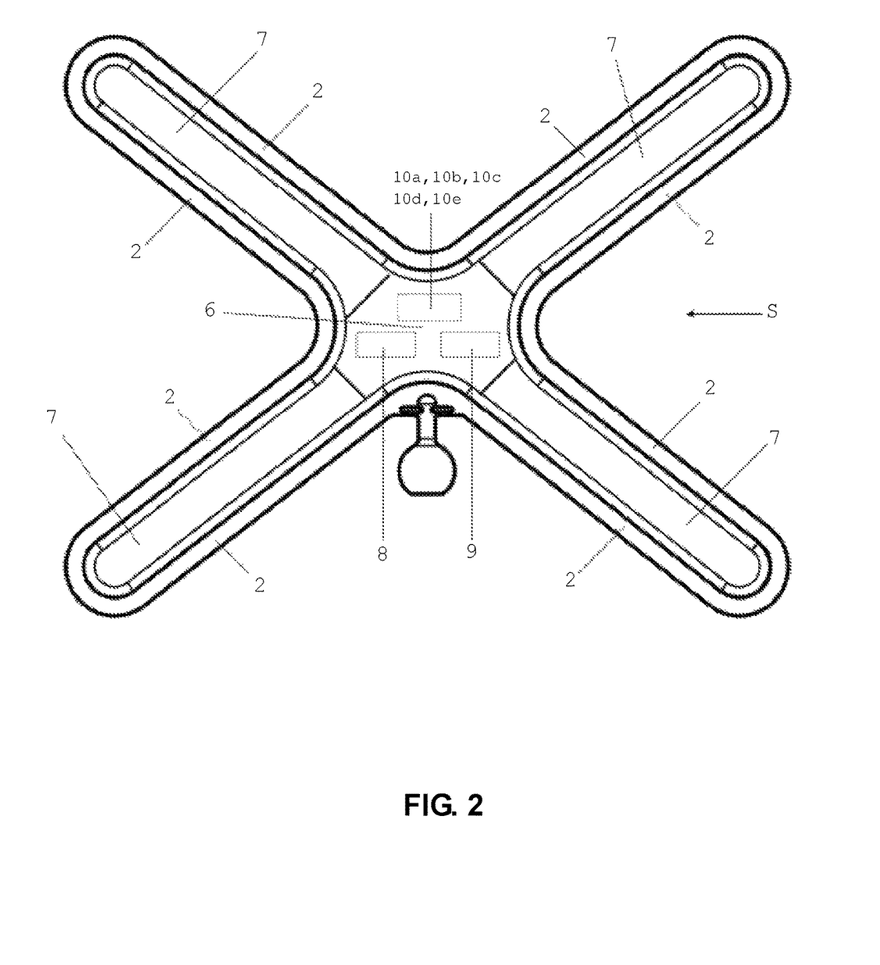
FIG. 2 a view of the support of this signal light.

FIG. 2 shows a view of such a signal light S with open receiving part 6 in the support 2 and with cross arms 7 on the support 2. On or in the receiving part 6, there are a radio receiver 8, a radio transmitter 9, a GNSS unit 10a, a Bluetooth unit 10b, a booster 10c, a dimmer 10d and a charge control unit 10e.

Figure 3:
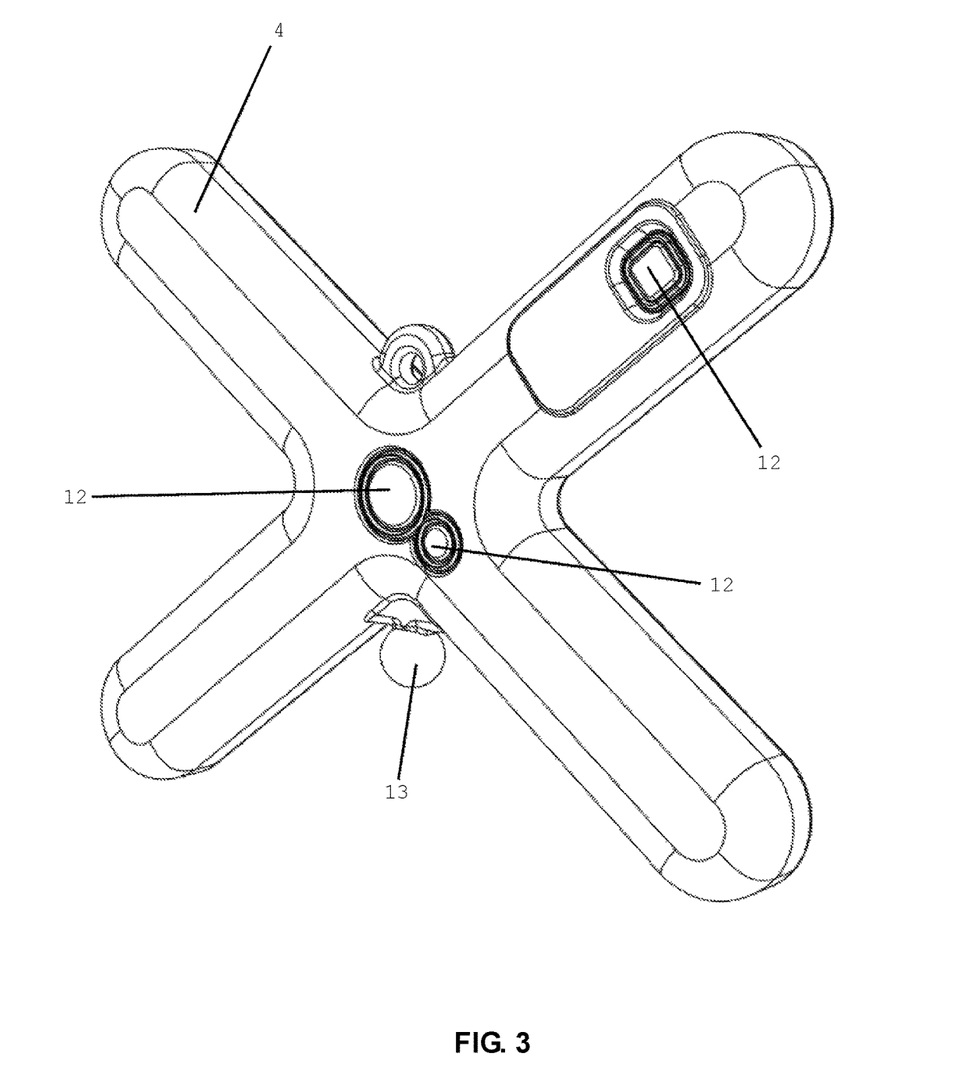
FIG. 3 a diagonal view of the rear side of the housing of the signal light.

FIG. 3 shows the switching elements 12 at the rear of the housing 4, which switch on and off the functions of the signal light (e.g. GNSS 10a, Bluetooth 10b, booster 10c, dimmer 10d, charge control unit 10e, LED color).

Figure 4:
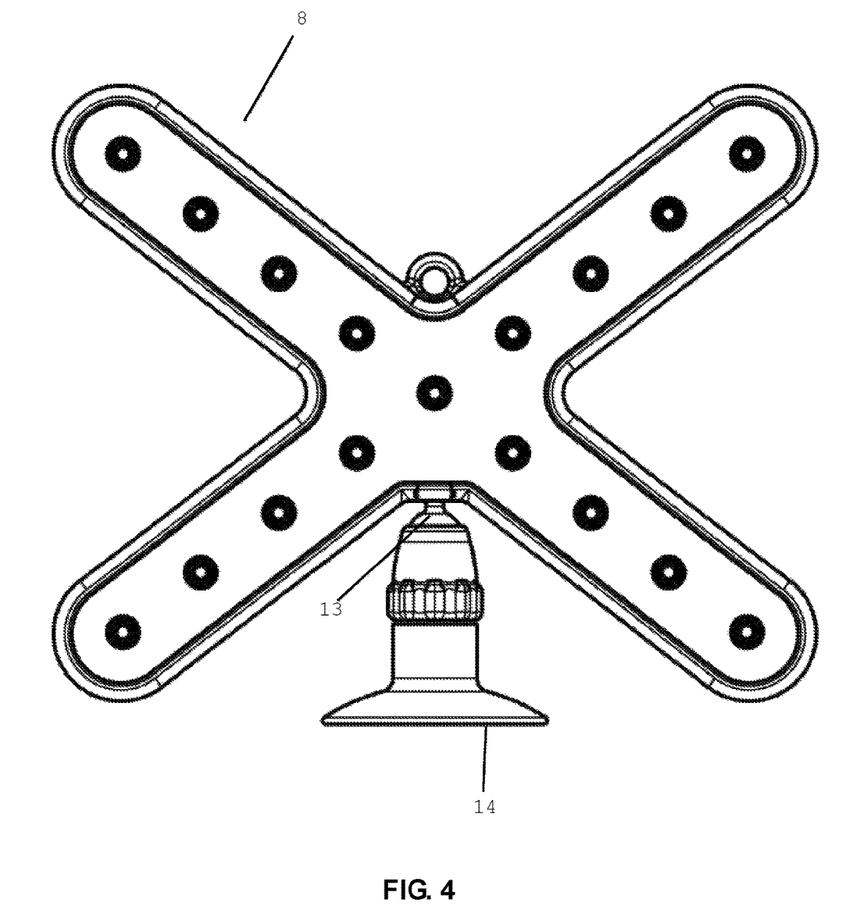
FIG. 4 a view of the front side of the housing of the signal light, illustrating the arrangement of an adapter.

According to another preferred exemplary embodiment, FIG. 4 shows an adapter 13 on the underside of the housing 4 and a receiving part fixed on the adapter 13, in this exemplary embodiment a suction cup holder 14, which is provided as support for the signal light.

Figure 5:
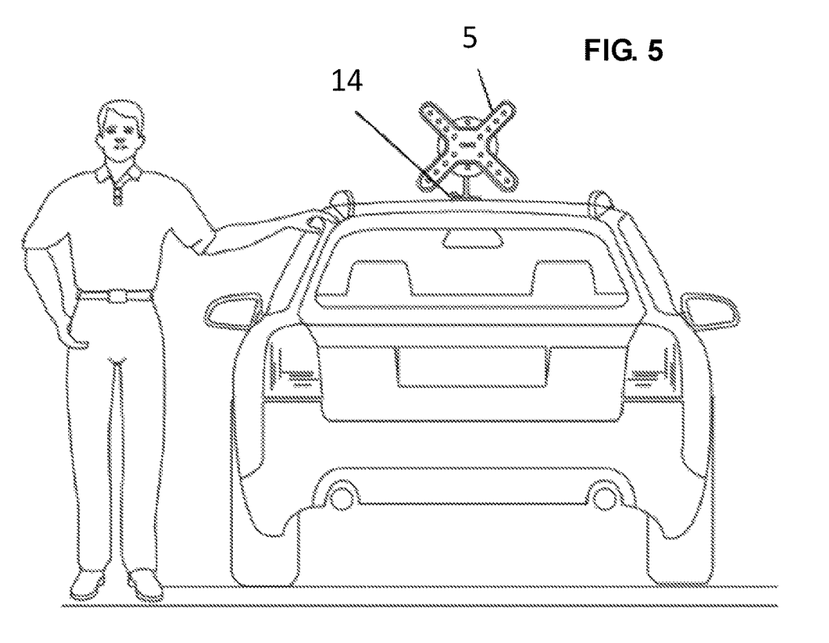
FIG. 5 a schematic illustration of the signal light during use on a passenger car.

FIG. 5 shows a possible use of the signal light S on a passenger car. There, the signal light S is positioned on the roof of the passenger car by means of a suction cup holder 14.

Figure 6A:
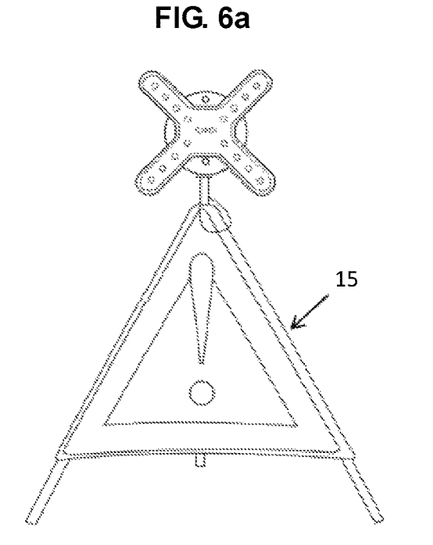
Figure 6B:
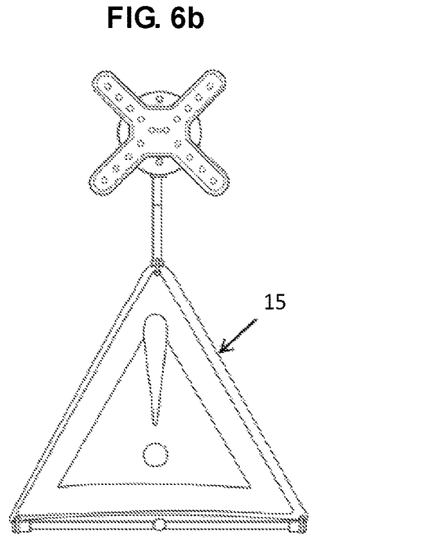

FIG. 6 (FIG. 6a, 6b) shows the use of the signal light S on a folding, e.g. three-legged warning sign 15 (in FIG. 6a in folded-out position; in FIG. 6b with legs folded up).

Figure 7:
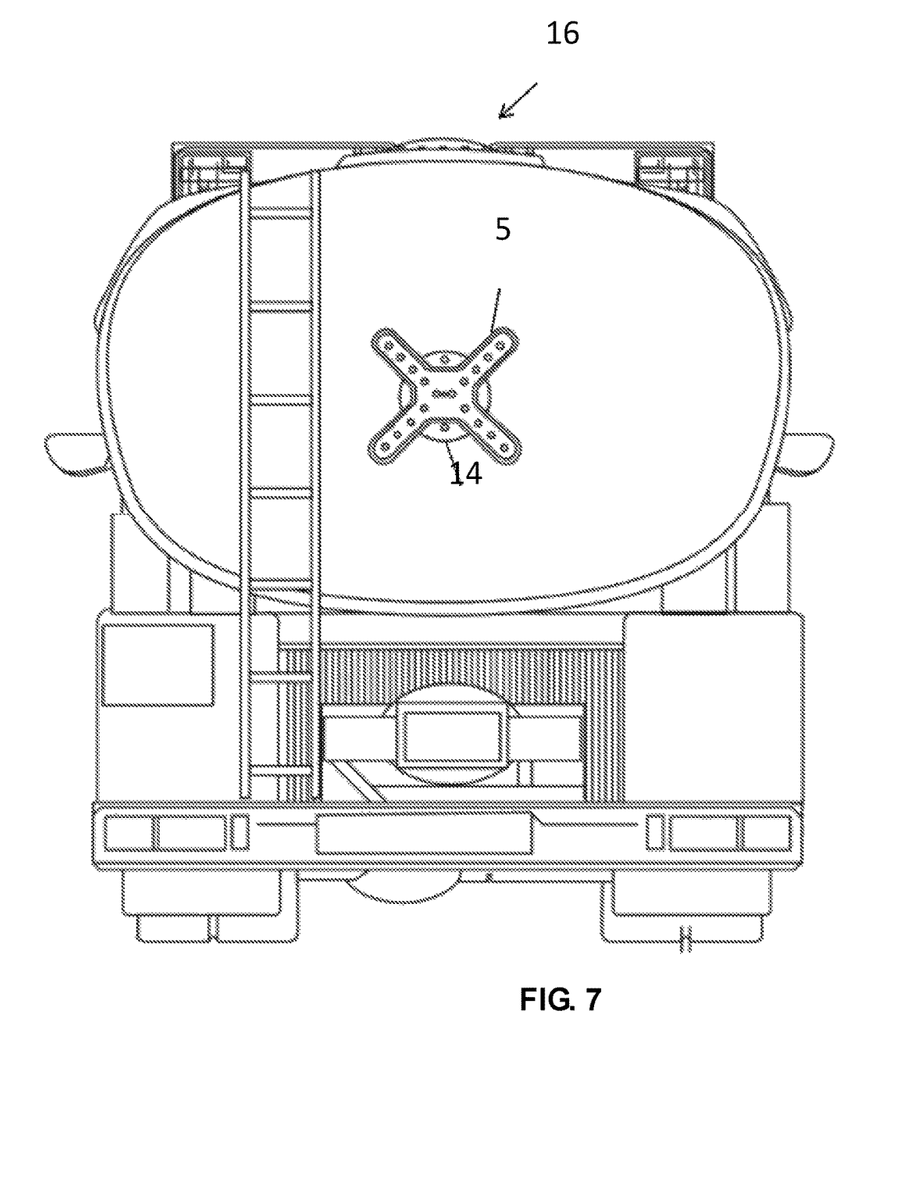
FIG. 7 a schematic illustration of the signal light during use on a dangerous goods vehicle.

Finally, FIG. 7 shows a use of the signal light S on a dangerous goods vehicle. There, the signal light S is fixed at the rear of the dangerous goods vehicle 16 to be secured with a modified suction cup holder 14, for example.

Figure 8:
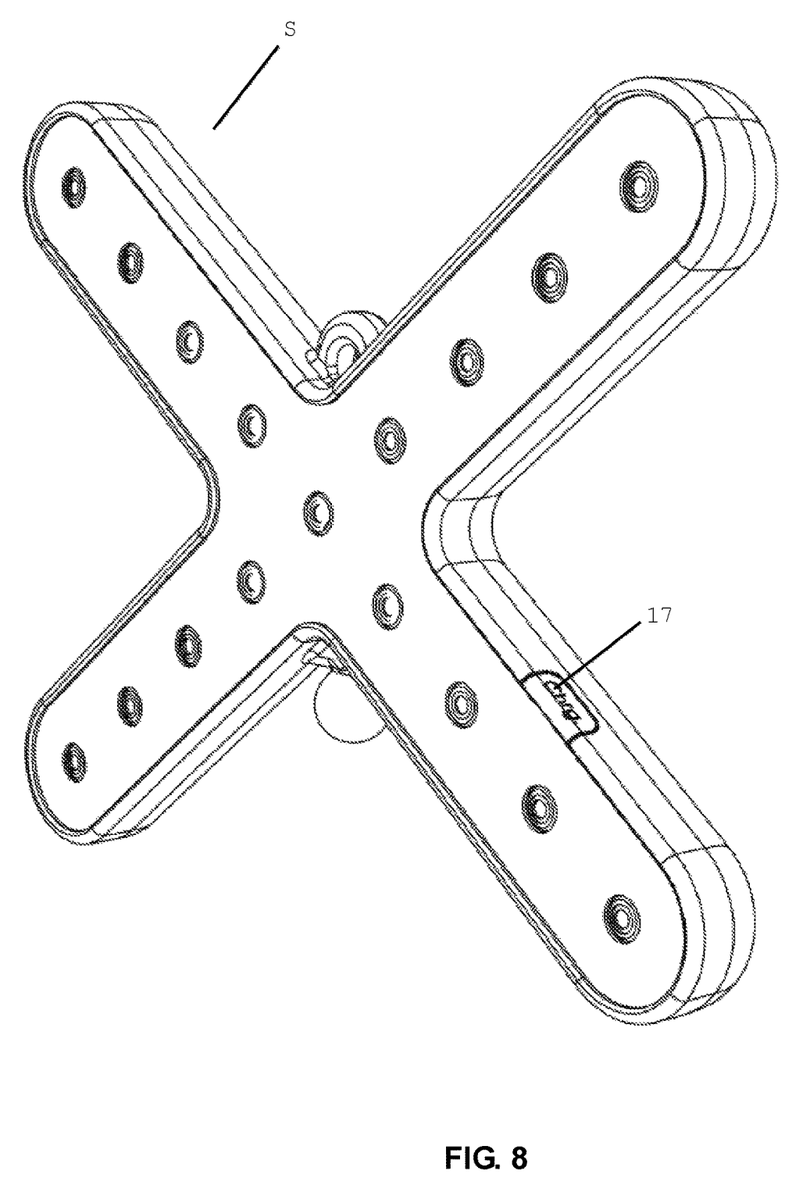
FIG. 8 shows a diagonal view of the front side of the housing of the signal light, illustrating the cover of a receiving device for a charging cable.

FIG. 8 shows a diagonal view of the signal light S, whereby a cover 17 for a plug connection is visible on one side arm. The plug connection serves to receive a charging cable for the charging of the accumulator.

Figure 9:
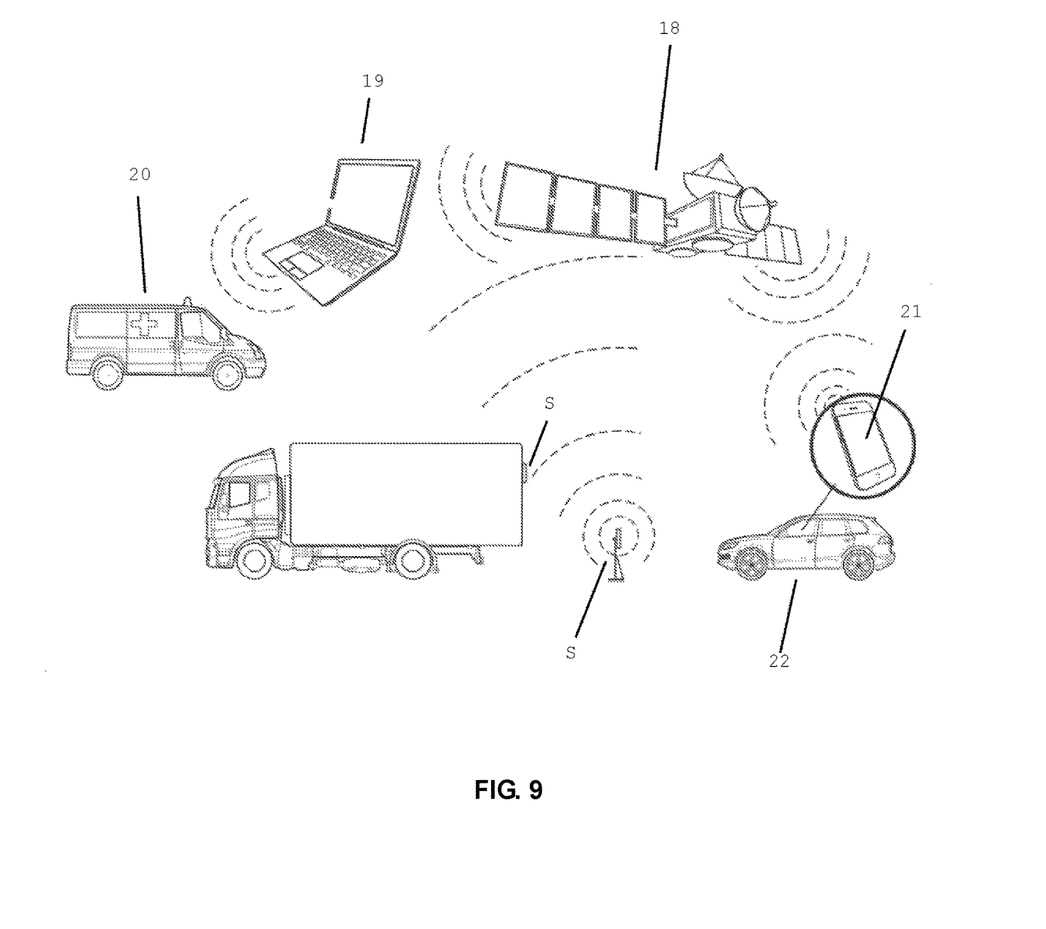
FIG. 9 shows a schematic illustration of functions of the signal light.

FIG. 9 shows the functional principle of the signal light S during a dangerous situation in road traffic. The signal light S transmits a signal to a satellite 18, which transmits the GNSS position of the signal light S to a central monitoring station 19, which again informs a blue light organization 20 about the dangerous situation. In particular, the GNSS data of the signal light S are transmitted to the central monitoring station 19 and the blue light organization 20 in the process. In addition, the satellite 18 transmits a signal with the GNSS data of the signal light S to receiving devices 21 of other traffic participants 22 to alert them to the dangerous situation. Preferably, the receiving device 21 is a mobile phone on which a suitable app (application software) is installed.

The invention claimed is:

1. A signal light with several light sources, in an x- or cross-shaped arrangement on an x- or cross-shaped support with a transparent or translucent cover on a front side, wherein the x- or cross-shaped support including the cover is arranged in a suitable x- or cross-shaped housing which is open on the front side, and which is made of a soft-elastic natural or synthetic rubber material.

2. The signal light according to claim 1, wherein the several light sources are LEDs and wherein the soft-elastic natural or synthetic rubber material is a thermoplastic elastomer (TPE, TPV).

3. The signal light according to claim 1, wherein the housing is connected with the support and/or the cover by a snap-fit connection.

4. The signal light according to claim 1, wherein the housing overlaps the support and/or the cover with a frontal beaded edge at the edge.

5. The signal light according to claim 4, wherein the beaded edge is closed in itself.

6. The signal light according to claim 1, wherein the material of the housing has as Shore A hardness of 50-80.

7. The signal light according to claim 1, wherein the cover on the support is fixed by screwed, adhesive, or ultrasound welding connection.

8. The signal light according to claim 1, wherein the support has a central receiving part for an electronic unit, and wherein cross arms extend away from the central receiving part.

9. The signal light according to claim 8, wherein the electronic unit has a switching element which is accessible from a rear of the cover.

10. The signal light according to claim 9, wherein the switching element comprises one or several key switch(es), magnetic switch(es), or a membrane keyboard, which can be used to control functions of the electronic unit.

11. The signal light according to claim 8, wherein the electronic unit has a radio unit with at least one radio receiver.

12. The signal light according to claim 8, wherein the electronic unit has a radio unit with at least one radio transmitter.

13. The signal light according to claim 8, wherein the electronic unit has a GNSS unit.

14. The signal light according to claim 8, wherein the electronic unit has a BLUETOOTH unit.

15. The signal light according to claim 8, wherein the electronic unit has a booster and/or a dimming unit.

16. The signal light according to claim 8, wherein the electronic unit has a battery charge control unit.

17. The signal light according to claim 1, wherein an adapter for fixing the signal light to a rack, stand or similar supporting device is attached to the housing.

* * * * *